US011012452B1

(12) United States Patent
Kats et al.

(10) Patent No.: US 11,012,452 B1
(45) Date of Patent: May 18, 2021

(54) SYSTEMS AND METHODS FOR ESTABLISHING RESTRICTED INTERFACES FOR DATABASE APPLICATIONS

(71) Applicant: Symantec Corporation, Mountain View, CA (US)

(72) Inventors: Daniel Kats, Culver City, CA (US); Daniel Marino, Los Angeles, CA (US)

(73) Assignee: NortonLifeLock, Inc., Tempe, AZ (US)

( * ) Notice: Subject to any disclaimer, the term of this patent is extended or adjusted under 35 U.S.C. 154(b) by 582 days.

(21) Appl. No.: 15/865,304

(22) Filed: Jan. 9, 2018

(51) Int. Cl.
*H04L 29/06* (2006.01)
*G06F 16/951* (2019.01)

(52) U.S. Cl.
CPC ........ *H04L 63/1425* (2013.01); *G06F 16/951* (2019.01); *H04L 63/0281* (2013.01); *H04L 63/1441* (2013.01)

(58) Field of Classification Search
None
See application file for complete search history.

(56) References Cited

U.S. PATENT DOCUMENTS

| | | | | |
|---|---|---|---|---|
| 7,558,796 | B1* | 7/2009 | Bromwich | G06F 16/24 |
| 7,568,229 | B1* | 7/2009 | Nachenberg | G06F 21/554 |
| | | | | 726/23 |
| 2008/0275843 | A1* | 11/2008 | Lal | G06F 21/6227 |
| 2013/0159285 | A1* | 6/2013 | Dees | G06F 16/24544 |
| | | | | 707/718 |
| 2015/0302197 | A1* | 10/2015 | Cohen | G06F 40/284 |
| | | | | 726/23 |
| 2017/0160880 | A1* | 6/2017 | Jose | G06F 8/34 |
| 2017/0220798 | A1* | 8/2017 | Madou | G06F 21/6227 |
| 2018/0063089 | A1* | 3/2018 | Moysi | G06F 21/604 |
| 2018/0069806 | A1* | 3/2018 | Kumar | H04L 47/827 |
| 2018/0167412 | A1* | 6/2018 | Barrett | H04L 67/2814 |
| 2019/0102437 | A1* | 4/2019 | Patthak | G06F 16/284 |
| 2019/0114210 | A1* | 4/2019 | Han | H04L 67/1004 |
| 2019/0199738 | A1* | 6/2019 | Jain | H04L 63/20 |

* cited by examiner

*Primary Examiner* — Eleni A Shiferaw
*Assistant Examiner* — Bassam A Noaman
(74) *Attorney, Agent, or Firm* — FisherBroyles, LLP

(57) ABSTRACT

The disclosed computer-implemented method for establishing restricted interfaces for database applications may include analyzing, by a computing device, query behavior of an application for query requests from the application to a remote database in a computer system and identifying, based on the analysis, an expected query behavior for the application. The method may include establishing, between the application and the remote database, a restricted interface. The method may include receiving, at the restricted interface, a query request from the application to the remote database and limiting, by the restricted interface, the query request from the application to the remote database based on the expected query behavior. The method may include determining, by checking the query request against the expected query behavior, that the query request is anomalous query behavior and performing a security action with respect to the computer system. Various other methods, systems, and computer-readable media are also disclosed.

20 Claims, 8 Drawing Sheets

```
SELECT entries.id, entries.user_id, entries.username
    FROM entries
        WHERE entries.id = 410
```

Query 401

```
SELECT entries.id, entries.user_id, entries.username
    FROM entries
        WHERE entries.id = 420
```

Query 402

*FIG. 4*

SYSTEMS AND METHODS FOR ESTABLISHING RESTRICTED INTERFACES FOR DATABASE APPLICATIONS

BACKGROUND

Many applications and services are available over the internet. These applications may be accessed by a user's computer accessing the internet, or a user's mobile device. These applications often require storing and accessing data. For example, the user may have a user account associated with the application or service. The user's user account data may be stored remotely such that the user may access the user account data from multiple devices. Often, the user account data may be stored in a remote database that is accessed by the application. Storing the user account data in the remote database may further protect the user account data, which may include personal data, payment information, etc. The application may have limited access to the remote database as a security measure.

However, an attacker may attempt to breach the security of the remote database by compromising the application. Because the application has access to the database, an attacker may be able to bypass some of the security measures by accessing the database through the application. For example, the attacker may pretend to be the application and send queries to the database. The database, believing the queries to be valid queries from the application, may accordingly respond, which may expose protected data.

The instant disclosure, therefore, identifies and addresses a need for systems and methods for establishing restricted interfaces for database applications.

SUMMARY

As will be described in greater detail below, the instant disclosure describes various systems and methods for establishing restricted interfaces for database applications.

In one example, a method for establishing restricted interfaces for database applications may include (1) analyzing, by the computing device, query behavior of an application for query requests from the application to a remote database in a computer system, (2) identifying, based on the analysis, an expected query behavior for the application, (3) establishing, between the application and the remote database, a restricted interface, (4) receiving, at the restricted interface, a query request from the application to the remote database, and (5) limit, by the restricted interface, the query request from the application to the remote database based on the expected query behavior.

In some examples, limiting the query request from the application to the remote database may include determining, by checking the query request against the expected query behavior, that the query request is an anomalous query behavior, and performing a security action with respect to the computer system in response to determining that the query request is an anomalous query behavior. In some examples, performing the security action may include preventing the application from accessing the remote database. In some examples, performing the security action may include dropping the query request. In some examples, performing the security action comprises logging the query request.

In some examples, the expected query behavior may include a set of queries the application is designed to use. Determining that the query request is an anomalous query behavior may include determining that the query request does not correspond to a query in the set of queries the application is designed to use. Determining that the query request is an anomalous query behavior may include determining that the query request corresponds to a query in the set of queries the application is designed to use that is being sent at an abnormal frequency.

In some examples, the restricted interface may include a database proxy configured to intercept all communication between the application and the remote database. In some examples, the restricted interface may include one or more microservices. A microservice may be a limited application configured for a specific type of database query.

In some examples, analyzing the query behavior may include analyzing one or more precompiled query templates associated with the application for the remote database. In some examples, analyzing the query behavior may include analyzing a query log associated with the application for the remote database.

In some examples, analyzing the query behavior further comprises analyzing a code associated with the application. Establishing the restricted interface may include modifying the code associated with the application to send query requests to the restricted interface. The code associated with the application may include a source code of the application. The code associated with the application may include a binary code of the application.

In one embodiment, a system for establishing restricted interfaces for database applications may include several modules stored in memory, including (1) an analysis module for analyzing query behavior of an application for query requests from the application to a remote database in a computer system, (2) an identification module for identifying, based on the analysis of the analysis module, an expected query behavior for the application, (3) an establishing module, stored in the memory, for establishing, between the application and the remote database, a restricted interface configured to limit query requests from the application to the remote database based on the expected query behavior, wherein the restricted interface comprises at least one of a database proxy configured to intercept all communication between the application and the remote database, and one or more microservices and a microservice is a limited application configured for a specific type of database query, (4) a receiving module, stored in the memory, for receiving, at the restricted interface, a query request from the application to the remote database, (5) a determination module, stored in the memory, for determining, by checking the query request against the expected query behavior, that the query request is an anomalous query behavior, (6) a security action module, stored in the memory, for performing a security action with respect to the computer system in response to determining that the query request is an anomalous query behavior, and at least one physical processor that executes the analysis module, the identification module, the establishing module, the receiving module, the determination module, and the security action module.

In some examples, performing the security action may include preventing the application from accessing the remote database. In some examples, performing the security action may include at least one of dropping the query request and logging the query request.

In some examples, the expected query behavior may include a set of queries the application is designed to use. Determining that the query request is an anomalous query behavior may include at least one of: determining that the query request does not correspond to a query in the set of queries the application is designed to use; and determining that the query request corresponds to a query in the set of queries the application is designed to use that is being sent at an abnormal frequency.

In some examples, analyzing the query behavior further may include analyzing one or more precompiled query templates associated with the application for the remote database or analyzing a query log associated with the application for the remote database.

In some examples, analyzing the query behavior further may include analyzing a code associated with the application. Establishing the restricted interface may include modifying the code associated with the application to send query requests to the restricted interface. The code associated with the application may include a source code or a binary code of the application.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) analyze, by the computing device, query behavior of an application for query requests from the application to a remote database in a computer system, (2) identify, based on the analysis, an expected query behavior for the application, wherein the expected query behavior comprises a set of queries the application is designed to use, (3) establish, between the application and the remote database, a restricted interface, wherein the restricted interface comprises at least one of a database proxy configured to intercept all communication between the application and the remote database, and one or more microservices and a microservice is a limited application configured for a specific type of database query, (4) receive, at the restricted interface, a query request from the application to the remote database, and (5) limit, by the restricted interface, the query request from the application to the remote database based on the expected query behavior.

In some examples, the instructions for limiting the query request may cause the computing device to determine, by checking the query request against the expected query behavior, that the query request is an anomalous query behavior, and perform a security action with respect to the computer system in response to determining that the query request is an anomalous query behavior. In some examples, performing the security action may include preventing the application from accessing the remote database.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

FIG. 4 is a simplified diagram of basic query analysis.

Figure 1:
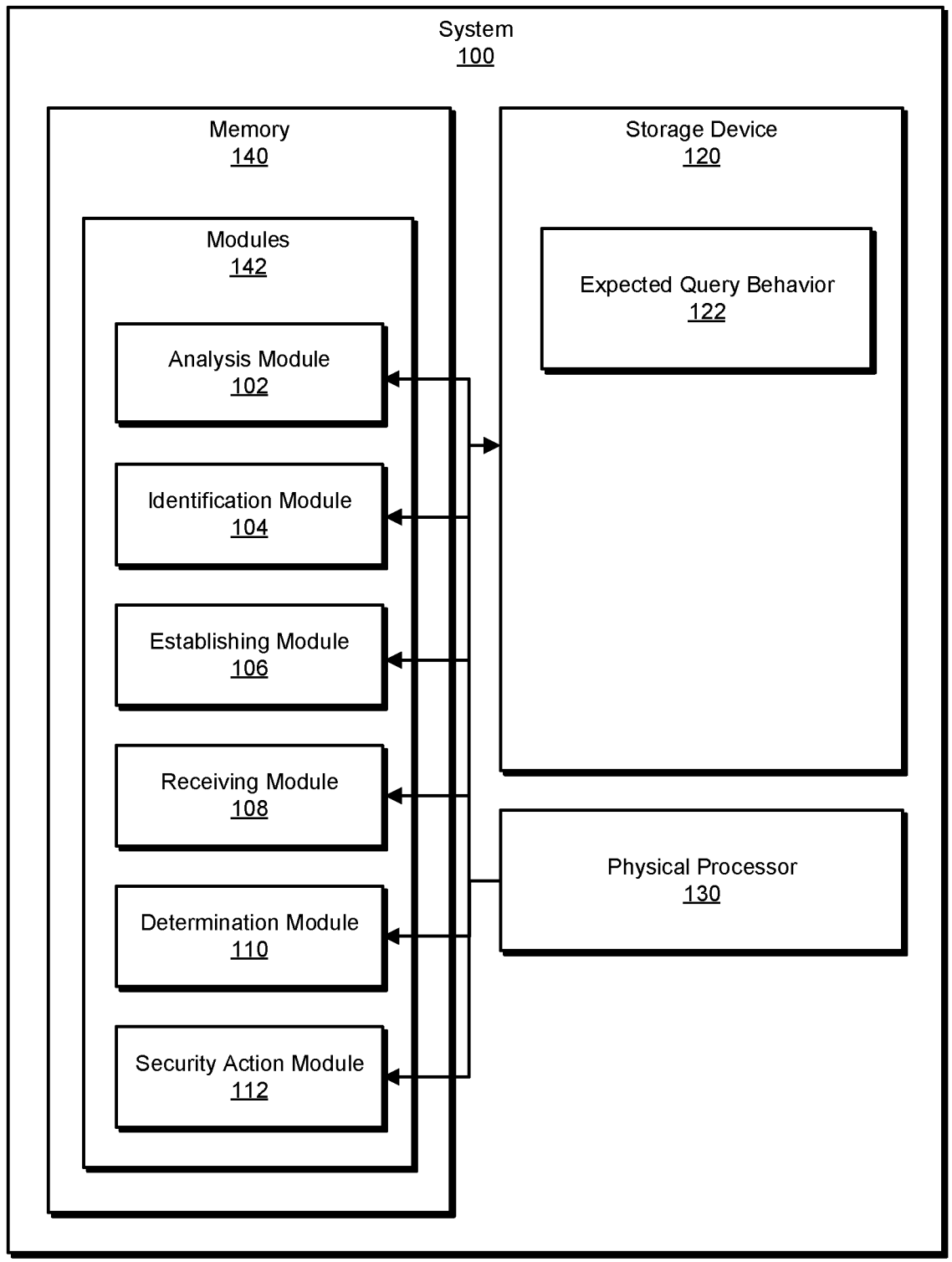
FIG. 1 is a block diagram of an example system for establishing restricted interfaces for database applications.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for establishing restricted interfaces for database applications. Attackers may compromise an application in order to gain access or attack a database accessed by the application. As will be explained in greater detail below, by determining expected query behavior of the application with respect to the database, the systems and methods described herein may be able to establish a restricted interface between the application and the database. The restricted interface may filter out anomalous queries from the application to the database, based on the expected query behavior. By isolating the application from the database using the restricted interface, the systems and methods described herein may be able to improve security of the database and minimize an attack surface of the database by minimizing vectors for attack. When compared to a conventional database interface, the restricted interface may reduce attack vectors of compromised applications.

In addition, the systems and methods described herein may improve the functioning of a computing device by detecting anomalous query behavior and preventing the anomalous query behavior from affecting a database. These systems and methods may also improve the field of heuristic-based computer security and/or database security by further isolating an application from the database.

Figure 2:
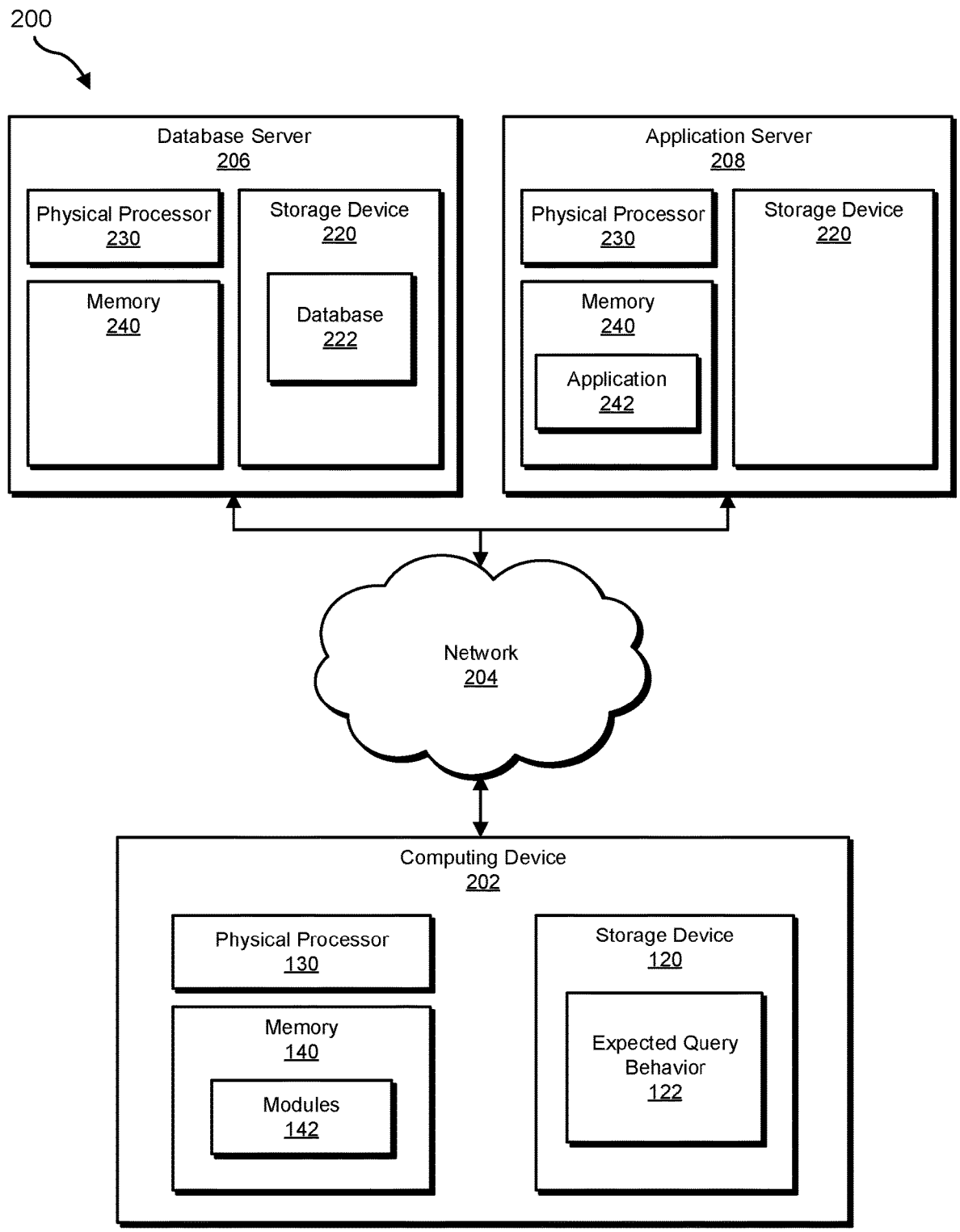
FIG. 2 is a block diagram of an additional example system for establishing restricted interfaces for database applications.

The following will provide, with reference to FIGS. 1-2, detailed descriptions of example systems for establishing restricted interfaces for database applications. Detailed descriptions of corresponding computer-implemented methods will also be provided in connection with FIG. 3. Descriptions of query type and parameter recognition are provided in connection with FIG. 4. Descriptions of example restricted interfaces are provided in connection with FIGS. 5 and 6. In addition, detailed descriptions of an example computing system and network architecture capable of implementing one or more of the embodiments described herein will be provided in connection with FIGS. 7 and 8, respectively.

FIG. 1 is a block diagram of an example system 100 for establishing restricted interfaces for database applications. As illustrated in this figure, example system 100 may include one or more modules 142 for performing one or more tasks. As will be explained in greater detail below, modules 142 may include an analysis module 102, an identification module 104, an establishing module 106, a receiving module 108, a determination module 110, and a security action module 112. Although illustrated as separate elements, one or more of modules 142 in FIG. 1 may represent portions of a single module or application. One or more of modules 142 may be optional.

In certain embodiments, one or more of modules 142 in FIG. 1 may represent one or more software applications or programs that, when executed by a computing device, may cause the computing device to perform one or more tasks. For example, and as will be described in greater detail below, one or more of modules 142 may represent modules stored and configured to run on one or more computing devices, such as the devices illustrated in FIG. 2 (e.g., computing device 202, database server 206, and/or application server 208). One or more of modules 142 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 142. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 142 stored in memory 140. Additionally or alternatively, physical processor 130 may execute one or more of modules 142 to facilitate establishing restricted interfaces for database applications. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a storage device 120. Storage device 120 generally represents any type or form of volatile or non-volatile storage device or medium capable of storing data and/or computer-readable instructions. In one example, storage device 120 may store, load, and/or maintain expected query behavior 122. Examples of storage device 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage device. As will be further described below, expected query behavior 122 may include data which indicates expected or permitted database queries for an application to access a database.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a database server 206 and an application server 208 via a network 204. In one example, all or a portion of the functionality of modules 142 may be performed by computing device 202, database server 206, application server 208, and/or any other suitable computing system. As will be described in greater detail below, one or more of modules 142 from FIG. 1 may, when executed by at least one processor of computing device 202, database server 206, and/or application server 208, enable computing device 202, database server 206, and/or application server 206 to establish restricted interfaces for database applications. For example, and as will be described in greater detail below, one or more of modules 142 may cause computing device 202, database server 206, and/or application server 208 to recite steps of method claim using FIG. 3.

Computing device 202 generally represents any type or form of computing device capable of reading computer-executable instructions. Computing device 202 may be one or more servers capable of hosting microservices. As used herein, the term "microservice" generally refers to a fine-grain software application designed to perform a single function. Additional examples of computing device 202 include, without limitation, servers, laptops, tablets, desktops, variations or combinations of one or more of the same, and/or any other suitable computing device.

Database server 206 generally represents any type or form of computing device that is capable of hosting a database 222, receive database queries, and provide responses to the queries. Additional examples of database server 206 include, without limitation, security servers, application servers, web servers, and/or storage servers configured to run certain software applications and/or provide various security, web, storage, and/or database services. Although illustrated as a single entity in FIG. 2, database server 206 may include and/or represent a plurality of servers that work and/or operate in conjunction with one another. Database 222 may be a collection of data that may be remotely accessible. Database 222 may be a relational database, in which data may be organized into tables of columns and rows. Database 222 may be accessed through queries, such as Structured Query Language (SQL) queries. Database 222 may be managed through a database-management system (DBMS). Examples of DBMS for database 222 include, without limitations, MySQL, PostgreSQL, EnterpriseDB, MongoDB, MariaDB, Microsoft SQL Server, Oracle, Sybase, SAP HANA, MemSQL, SQLite, and IBM DB2, or any other suitable DBMS. Database 222 may be configured for prepared statements. As used herein, the term "prepared statement" generally refers to database statements, such as queries or updates, which may be compiled by a DBMS to be executed repeatedly with high efficiency and may be in the form of a template with parameters. Prepared statements allow database 222 to receive a query type and corresponding parameters rather than a full query.

Database server 206 includes a physical processor 230. Physical processor 230 generally represents any type or form of hardware-implemented processing unit capable of interpreting and/or executing computer-readable instructions. In one example, physical processor 130 may access and/or manage database 222 stored in a storage device 220.

Examples of physical processor 230 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor. Database server 206 may also include one or more memory devices, such as memory 240. Memory 240 generally represents any type or form of volatile or non-volatile storage device or medium capable of storing data and/or computer-readable instructions. Examples of memory 240 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory. Database server 206 may also include storage device 220. Storage device 220 generally represents any type or form of volatile or non-volatile storage device or medium capable of storing data and/or computer-readable instructions. In one example, storage device 220 may store, load, and/or maintain database 222. Examples of storage device 220 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage device.

Application server 208 generally represents any type or form of computing device that is capable of hosting an application, such as application 242, which may access a remote database, such as database 222 hosted by database server 206. Additional examples of application server 208 include, without limitation, security servers, web servers, storage servers, and/or database servers configured to run certain software applications and/or provide various security, web, storage, and/or database services. Although illustrated as a single entity in FIG. 2, application server 208 may include and/or represent a plurality of servers that work and/or operate in conjunction with one another. Application 242 may be an application accessed by remote client devices, such as a web application, or may be any other application which accesses a remote database.

Application server 208 includes a physical processor 230. Physical processor 230 generally represents any type or form of hardware-implemented processing unit capable of interpreting and/or executing computer-readable instructions. In one example, physical processor 230 may execute application 242 in a memory 240. Examples of physical processor 230 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor. Application server 208 may also include one or more memory devices, such as memory 240. Memory 240 generally represents any type or form of volatile or non-volatile storage device or medium capable of storing data and/or computer-readable instructions. Examples of memory 240 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory. Application server 206 may also include a storage device 220. Storage device 220 generally represents any type or form of volatile or non-volatile storage device or medium capable of storing data and/or computer-readable instructions. Examples of storage device 220 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage device.

In certain implementations, all or a portion of computing device 202 may be integrated with one or more of database server 206 and application 208. However, all or a portion of the functionality of modules 142 may be hosted on a virtual machine separate from database 222 and/or application 242. As used herein, the term "virtual machine" generally refers to any operating system environment that is abstracted from computing hardware by a virtual machine manager (e.g., a hypervisor).

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
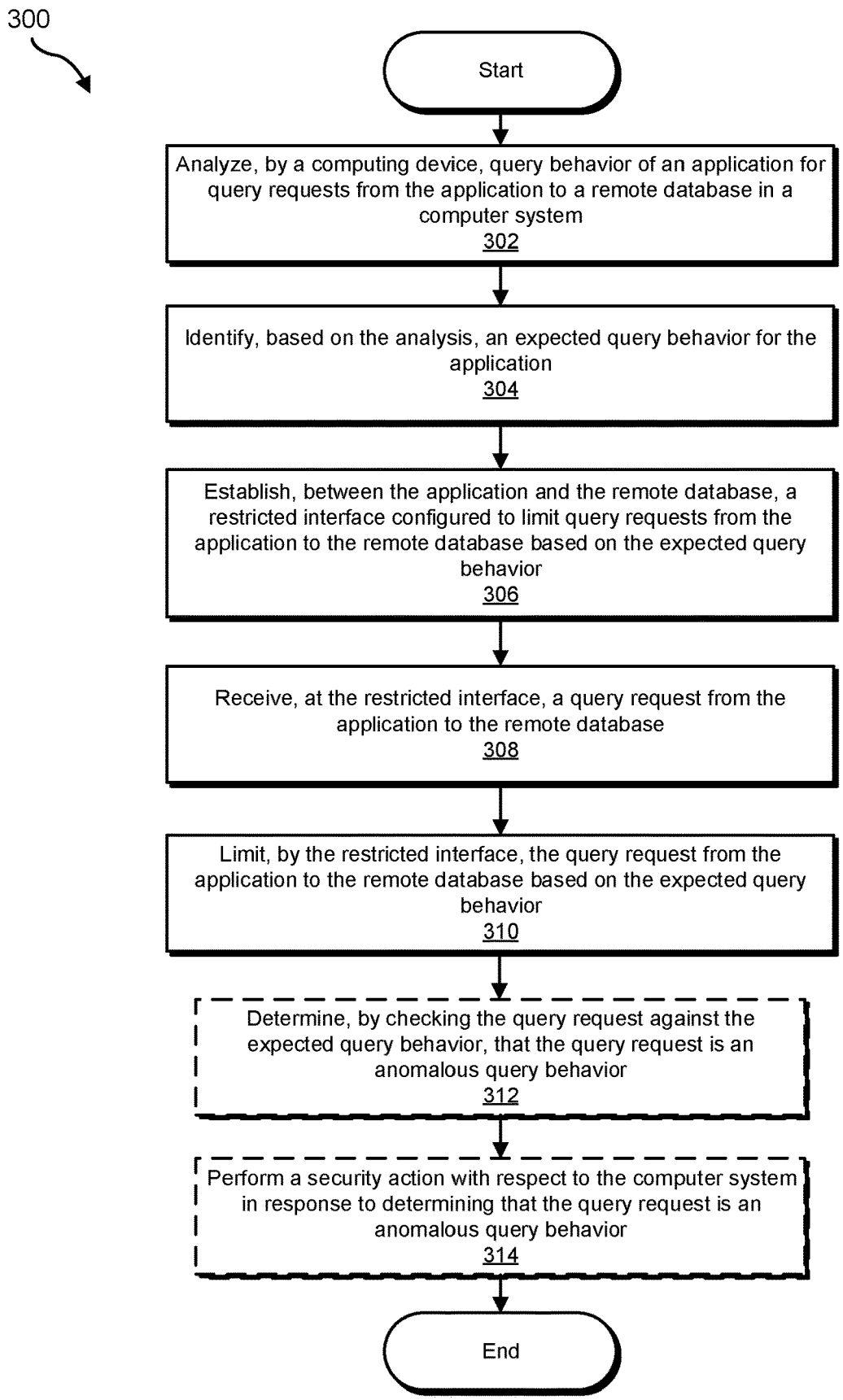
FIG. 3 is a flow diagram of an example method for establishing restricted interfaces for database applications.

FIG. 3 is a flow diagram of an example computer-implemented method 300 for establishing restricted interfaces for database applications. The steps shown in FIG. 3 may be performed by any suitable computer-executable code and/or computing system, including system 100 in FIG. 1, computing device 202, database server 206, and/or application server 208 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may analyze query behavior of an application for query requests from the application to a remote database in a computer system. For example, analysis module 102 may, as part of computing device 202 in FIG. 2, analyze query behavior of application 242 for query requests to database 222 in database server 206.

The query behavior may be analyzed in one or more ways. Analyzing the query behavior may comprise analyzing one or more precompiled query templates associated with the application for the remote database. If database 222 is configured for prepared statements and computing device 202 has access to the prepared statements, computing device 202 may analyze the prepared statements associated with application 242. The prepared statements may provide template forms of permitted queries for the application 242 such that parameters for the queries may be defined.

Analyzing the query behavior may comprise analyzing a query log associated with the application for the remote database. Database 222 may not be configured for prepared statements and/or computing device 202 may not have such access to database 222. Computing device 202 may have access to query logs of database 222, such as a query log corresponding to application 242. The query log may include details of all queries made by application 242 to database 222, such as the specific query, timestamp of the query, IP address and user credentials associated with the query, etc. Computing device 202 may analyze, for example through pattern recognition, the logged queries to determine, for example, what types of queries were made by application 242, and by comparing differences between similar types of queries, parameters for each query type.

FIG. 4 shows a query 401 and a query 402. Query 401 and query 402 may be queries determined from a query log. Computing device 202 may recognize that query 401 and query 402 differ in their respective WHERE clauses (e.g., entries.id=410 versus entries.id=420). Computing device 202 may categorize the similar clauses as a query type (e.g., the SELECT/FROM clauses), and determine that the differing portions as a parameter (e.g., "410" and "420").

Analyzing the query behavior may comprise analyzing a code associated with the application. For example, computing device 202 may have access to a source code of application 242. As used herein, the term "source code" generally refers to computer instructions, in a human-readable form, which specify actions to be performed by the computer for an application. Source code may be compiled into binary code for execution by the computer. As used herein, the term "binary code" generally refers to instructions understood and performed by a processor of a computer, which may be a compiled form of source code for an application.

Computing device 202 may analyze the source code of application 242 to determine when application 242 attempts reading from and writing to database 222, what types of queries are made, and parameters for the query types. For example, computing device 202 may determine functions for when application 242 reads or writes data to database 222, and what queries are made using what parameters.

Alternatively, computing device 202 may analyzed the binary code of application 242 to determine when application 242 attempts connecting to database server 206, and determine what types of queries are made, and parameters for the query types.

Query types may include reading data (e.g., SELECT), writing data (e.g., UPDATE), adding new entries (e.g., INSERT), and removing entries (e.g., DELETE). Parameters may include, without limitations, ID numbers, usernames, passwords, account fields, and other data stored and/or accessed from a database.

At step 304, one or more of the systems described herein may identify, based on the analysis, an expected query behavior for the application. The expected query behavior may comprise a set of queries the application is designed to use. For example, identification module 104 may, as part of computing device 202 in FIG. 2, identify the expected query behavior of application 242 for query requests to database 222.

If computing device 202 analyzed prepared statements, the expected query behavior may be defined by the prepared statements. The prepared statements may provide a complete list of query types and parameters that application 242 is configured for, and further has permission for accessing the database 222.

If computing device 202 analyzed the query log associated with application 242, the expected query behavior may include query types and parameters determined by the analysis of the query log.

If computing device 202 analyzed code associated with application 242, the expected query behavior may include query types and parameters determined by the analysis of the code.

The expected query behavior may limit what queries application 242 may be permitted to and/or expected to request of database 222. Queries that are not in the expected query behavior may therefore be anomalous queries, which may indicate application 242 has been compromised.

At step 306, one or more of the systems described herein may establish, between the application and the remote database, a restricted interface configured to limit query requests from the application to the remote database based on the expected query behavior. For example, establishing module 106 may, as part of computing device 202 in FIG. 2, establish a restricted interface between application 242 and database 222.

Figure 5:
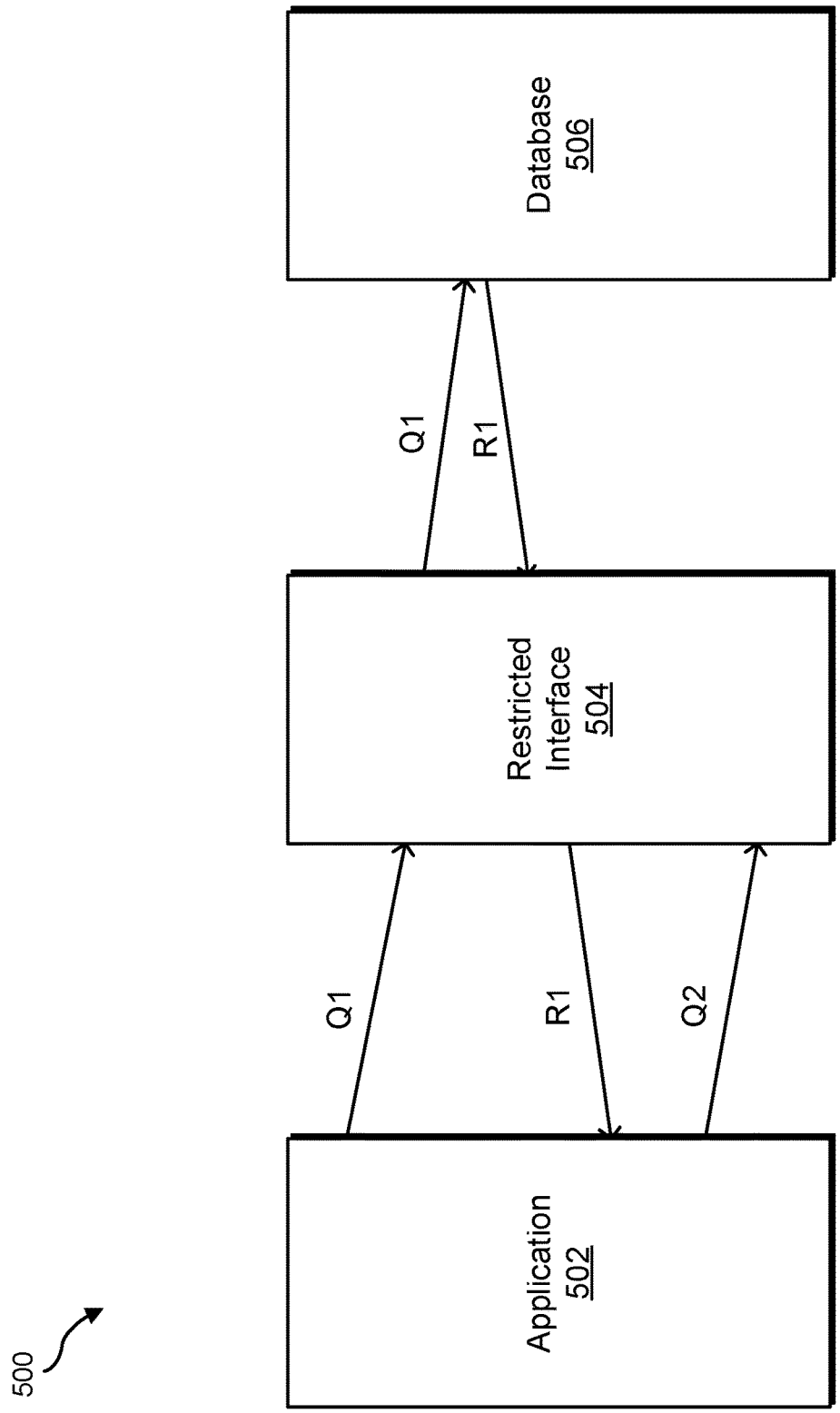
FIG. 5 is a diagram of query routing using a restricted interface.

FIG. 5 conceptually shows a restricted interface 504, which may be implemented with computing device 202, between an application 502, which may be application 242, and a database 506, which may be database 222. Application 502 sends a query request Q1. A query request may be a full query, or may be parameters for a query type, for example if database 506 is configured with prepared statements. Restricted interface 504 receives query request Q1, rather than database 506 receiving query request Q1 directly from application 502.

The restricted interface may be implemented in one or more ways. The restricted interface may comprise a database proxy configured to intercept all communication between the application and the remote database. For example, restricted interface 504 may be a proxy server configured to appear as database 506 to application 502. Alternatively, application 502 may be modified to access a server on which restricted interface 504 resides.

Figure 6:
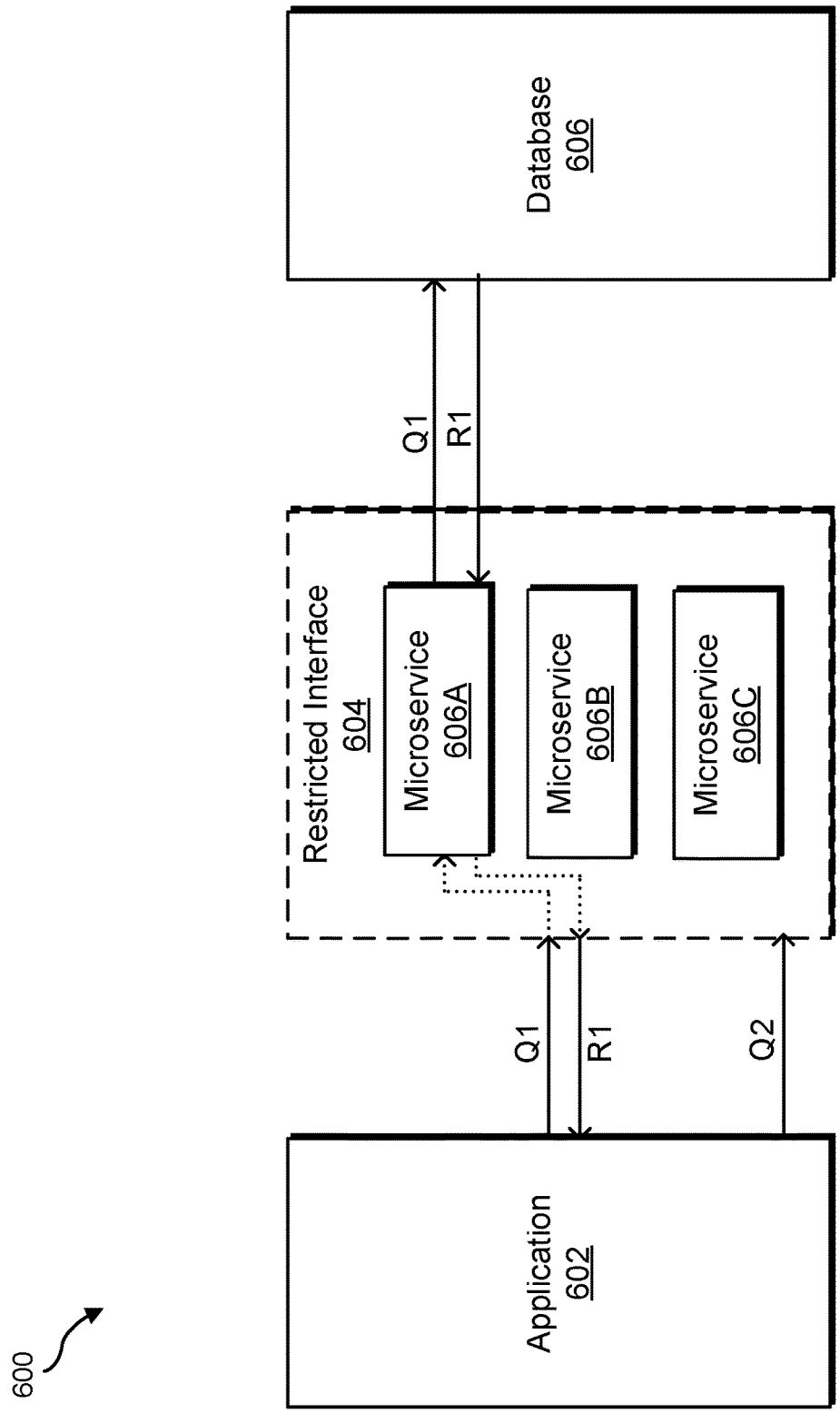
FIG. 6 is a diagram a restricted interface including microservices.

The restricted interface may comprise one or more microservices. The microservices may be limited applications each configured for a specific type of database query. FIG. 6 shows a diagram in which the restricted interface is implemented as microservices. Restricted interface 604, which may be restricted interface 504 and may be implemented with computing device 202, is between an application 602, which may be application 242, and a database 606, which may be database 222. Restricted interface 604 may include a microservice 606A, a microservice 606B, and a microservice 606C. Restricted interface 604 may include more or fewer microservices. Each of microservices 606A-606C may correspond to different query types. For example, microservice 606A may correspond to reading data, microservice 606B may correspond to writing/updating data, and microservice 606C may correspond to adding new entries. Restricted interface 604 may be an actual server or proxy server which receives query requests and forwards to the appropriate microservice, or may be a conceptual grouping of the microservices. Microservices 606A-606C may reside on one or more servers, and may reside on separate servers. Microservices 606A-06C may reside on a same server as database 606, on a separate virtual machine.

Establishing the restricted interface may comprise modifying the code associated with the application to send query requests to the restricted interface. For example, source code or binary code of application 502 may be modified to send query requests to restricted interface 504. Source code or binary code of application 602 may be modified to send query requests to microservice 606A, microservice 606B, and microservice 606C, based on query type.

In certain implementations, establishing the restricted interface may actively limit the application to only sending query requests conforming to the expected query behavior. For example, source code or binary code of application 602 may be modified to only send query requests to microservice 606A, microservice 606B, and microservice 606C, based on query type. Application 602 may not be able to send query requests of a non-expected query type because a corresponding microservice may not be known.

The restricted interface may be implemented with and/or in conjunction with one or more firewalls. As used herein, the term "firewall" generally refers to a network security system configured to monitor and control incoming and outgoing network traffic based on predetermined security rules. Establishing the restricted interface may include establishing one or more firewalls between the application and the remote database such that the application cannot communicate directly to the remote database. For example, computing device 202 may establish firewalls on database server 206 and/or network 204 to block network traffic between application server 208 and database server 206.

At step 308, one or more of the systems described herein may receive, at the restricted interface, a query request from the application to the remote database. For example, receiving module 108 may, as part of computing device 202 in FIG. 2, receive a query request from application 242 to database 222.

For example, in FIG. 5, restricted interface 504 receives query request Q1 from application 502 before database 506 receives query request Q1. Restricted interface 504 may determine that query request Q1 is valid (e.g., is part of expected query behavior for application 502), and forward query request Q1 to database 506. Database 506 returns a response R1 to restricted interface 504, rather than to application 502. The response may include requested data if the query request was a request for data, or may include a success/fail flag if, for instance, the query request was to update/write/delete data. Restricted interface 504 forwards response R1 to application 502 in response to query request Q1.

In FIG. 6, restricted interface 604 receives query request Q1 from application 602 before database 606 receives query request Q1. More specifically, microservice 606A receives query request Q1. Application 602 may be configured to send query requests to specific microservices, or generally to restricted interface 604, which may forward query requests to the appropriate microservice. Microservice 606A may determine that query request Q1 is valid and forward query request Q1 to database 606, which may return a response R1 to microservice 606A. Microservice 606A may forward response R1 to application 602.

At step 310, one or more of the systems described herein may limit, by the restricted interface, the query request from the application to the remote database based on the expected query behavior. For example, one or more of modules 142, such as determination module 110 and/or security action module 112 may, as part of computing device 202 in FIG. 2, may limit the query request from application 242 to database 222 based on the expected query behavior.

For example, in FIG. 5, restricted interface 504 may act as a filter by filtering out query requests from application 502 which do not conform to the expected query behavior. In FIG. 6, reconfiguring application 602 to establish restricted interface 604 may limit the types of queries that application 602 can send to the types defined in the expected query behavior, as application 602 may not know where (e.g., to which microservice) to send non-expected query types.

Because the restricted interface, rather than the remote database, receives query requests from the application, the restricted interface may provide a measure of security for the remote database. To access the remote database, an attacker may need to find a vulnerability in the application server and also find a vulnerability in the restricted interface.

The restricted interface may also take proactive steps with respect to anomalous query behavior. At step 312, which may be optional and which may be a substep of step 310, one or more of the systems described herein may determine, by checking the query request against the expected query behavior, that the query request is an anomalous query behavior. For example, determination module 110 may, as part of computing device 202 in FIG. 2, determine whether the query request from application 242 is an anomalous query.

Determining that the query request is an anomalous query behavior may include determining that the query request does not correspond to a query in the set of queries the application is designed to use. For example, if the expected query behavior included SELECT, INSERT, UPDATE queries, and the query request was a DELETE query, the query request may be anomalous query behavior. In another example, if the query request was a SELECT*query (which selects all available columns in the table), and the expected query behavior includes selecting of specific columns only, the query request may be anomalous query behavior. An attacker may have compromised application 242, and may attempt to gain access to database 222 by requesting more data than application 242 may normally have access to, by selecting columns that application 242 may not be programmed to access. The attacker may attempt to alter database 222, such as by deleting or updating entries, in ways that application 242 is not programmed to alter.

Determining that the query request is an anomalous query behavior comprises determining that the query request corresponds to a query in the set of queries the application is designed to use that is being sent at an abnormal frequency. The query request may be a valid query request sent at an abnormal high rate. For example, the attacker may be attempting to access all entries of database 222 by repeatedly sending query requests for individual entries, and iterating through all available entries. Although each individual query request may be valid, the high frequency of sending the same query request, which one or more changed parameters, may indicate the attacker attempting to access database 222.

In FIG. 5, a query request Q2 may be anomalous query behavior. Restricted interface 504 may determine that query request Q2 is not included in the expected query behavior for one or more reasons as described herein.

In FIG. 6, a query request Q2 may be anomalous query behavior. Restricted interface 604 may determine that query request Q2 is not included in the expected query behavior for one or more reasons as described herein. Alternatively, query request Q2 may be of a query type that does not have a corresponding microservice. Thus, query request Q2 may not be sent to any microservice.

At step 314, which may be optional and which may be a substep of step 310, one or more of the systems described herein may perform a security action with respect to the computer system in response to determining that the query request is an anomalous query behavior. For example, security action module 112 may, as part of computing device 202 in FIG. 2, perform a security action with respect to database server 206 in response to determining that the query request from application 242 is an anomalous query.

The security action may include preventing the application from accessing the remote database. For example, application 242 and/or application server 208 may be quarantined, isolated or blocked from network 204, or otherwise blocked or prevented from making further query requests to database 222 and/or database server 206. Database 222 and/or database server 206 may be isolated from network 204 or communication from application 242 and/or application server 208 may be blocked. Database 222 and/or database server 206 may be instructed to ignore and/or discard communication from application 242 and/or application server 208.

The security action may include dropping the query request. For example, in FIG. 5, query request Q2 may not be sent to database 506. Thus, database 506 may be protected against anomalous query behavior.

In FIG. 6, query request Q2 may not have a proper destination. Thus, database 606 may be protected against anomalous query behavior.

The security action may include logging the query request. For example, computing device 202 may log the anomalous query behavior. The logged anomalous query behavior may be further analyzed, for example to better refine the expected query behavior, to determine how application 242 has been comprised, and/or to determine what types of attacks on database 222 have been encountered. Other security actions may include providing alerts or notifications to system administrators, shutting down all access to the database, quarantining the application, etc. The process 300 and/or steps therein may repeat as needed, for example any changes to the application may warrant a reanalysis of expected query behavior.

As explained above in connection with example method 300 in FIG. 3, a restricted interface between an application and a database may be established. The application and/or database may be analyzed to determine expected query behavior of the application. The expected query behavior may define what types of queries and related parameters are permitted, as well as what types of queries and related parameters are not permitted. The restricted interface may enforce the expected query behavior by inserting itself between the application and the database. Any query requests sent by the application are received by the restricted interface, which filters permitted query requests to the database. Any unpermitted or unusual query requests may trigger a security action, such as dropping the query request, logging the query request, etc. Thus, the database itself may not be subjected to anomalous query behavior and may be protected from attacked by a compromised application.

Figure 7:
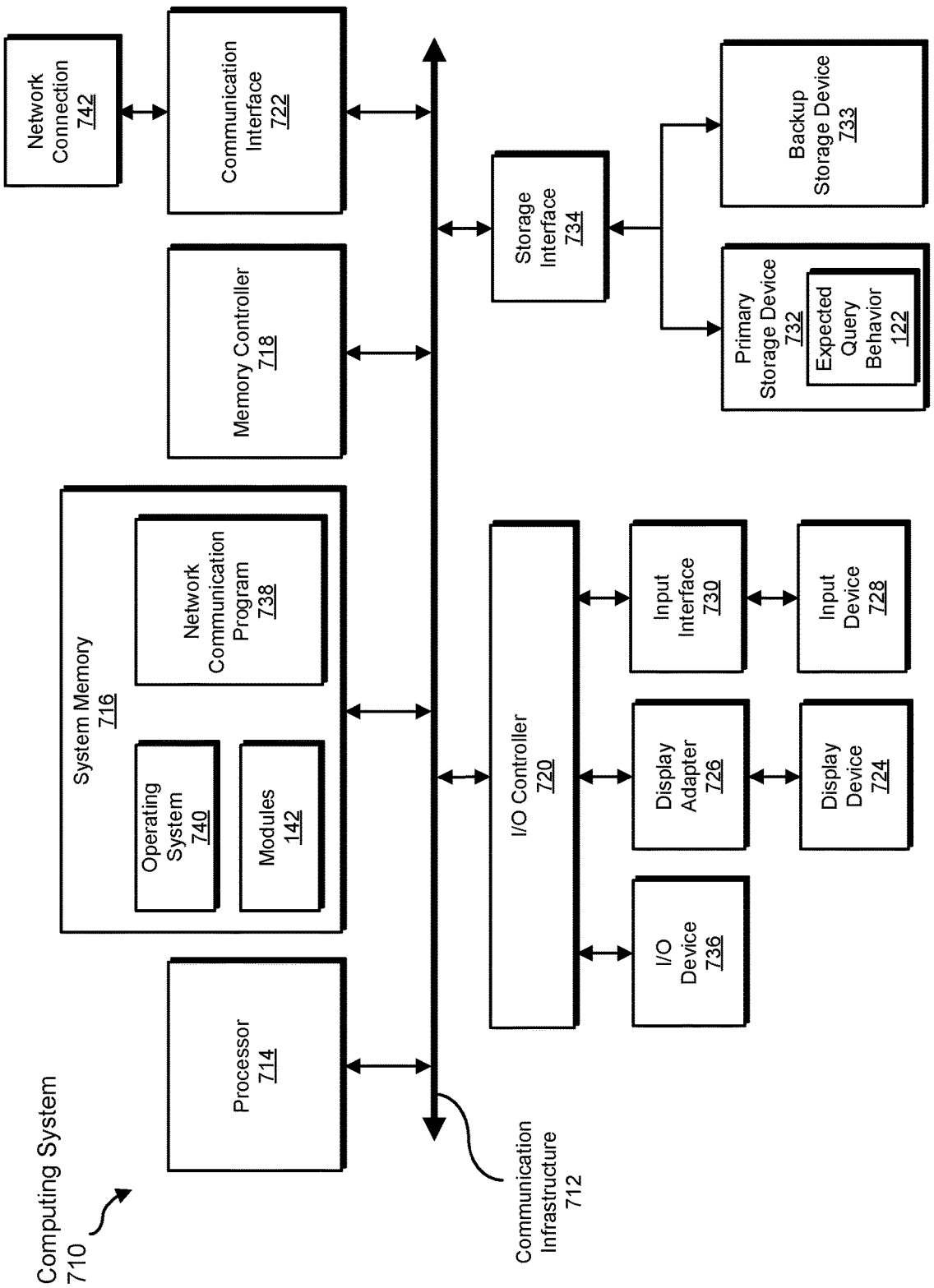
FIG. 7 is a block diagram of an example computing system capable of implementing one or more of the embodiments described and/or illustrated herein.

FIG. 7 is a block diagram of an example computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the example embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In some examples, system memory 716 may store and/or load an operating system 740 for execution by processor 714. In one example, operating system 740 may include and/or represent software that manages computer hardware and software resources and/or provides common services to computer programs and/or applications on computing system 710. Examples of operating system 740 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

As illustrated in FIG. 7, computing system 710 may also include at least one display device 724 coupled to I/O controller 720 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, example computing system 710 may also include at least one input device 728 coupled to I/O controller 720 via an input interface 730. Input device 728 generally represents any type or form of input device capable of providing input, either computer or human generated, to example computing system 710. Examples of input device 728 include, without limitation, a keyboard, a pointing device, a speech recognition device, variations or combinations of one or more of the same, and/or any other input device.

Additionally or alternatively, example computing system 710 may include additional I/O devices. For example, example computing system 710 may include I/O device 736. In this example, I/O device 736 may include and/or represent a user interface that facilitates human interaction with computing system 710. Examples of I/O device 736 include, without limitation, a computer mouse, a keyboard, a monitor, a printer, a modem, a camera, a scanner, a microphone, a touchscreen device, variations or combinations of one or more of the same, and/or any other I/O device.

Communication interface 722 broadly represents any type or form of communication device or adapter capable of facilitating communication between example computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

In some examples, system memory 716 may store and/or load a network communication program 738 for execution by processor 714. In one example, network communication program 738 may include and/or represent software that enables computing system 710 to establish a network connection 742 with another computing system (not illustrated in FIG. 7) and/or communicate with the other computing system by way of communication interface 722. In this example, network communication program 738 may direct the flow of outgoing traffic that is sent to the other computing system via network connection 742. Additionally or alternatively, network communication program 738 may direct the processing of incoming traffic that is received from the other computing system via network connection 742 in connection with processor 714.

Although not illustrated in this way in FIG. 7, network communication program 738 may alternatively be stored and/or loaded in communication interface 722. For example, network communication program 738 may include and/or represent at least a portion of software and/or firmware that is executed by a processor and/or Application Specific Integrated Circuit (ASIC) incorporated in communication interface 722.

As illustrated in FIG. 7, example computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, expected query behavior 122 from FIG. 1 may be stored and/or loaded in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 710 may be configured as an Application Specific Integrated Circuit (ASIC) adapted to implement one or more of the example embodiments disclosed herein.

Figure 8:
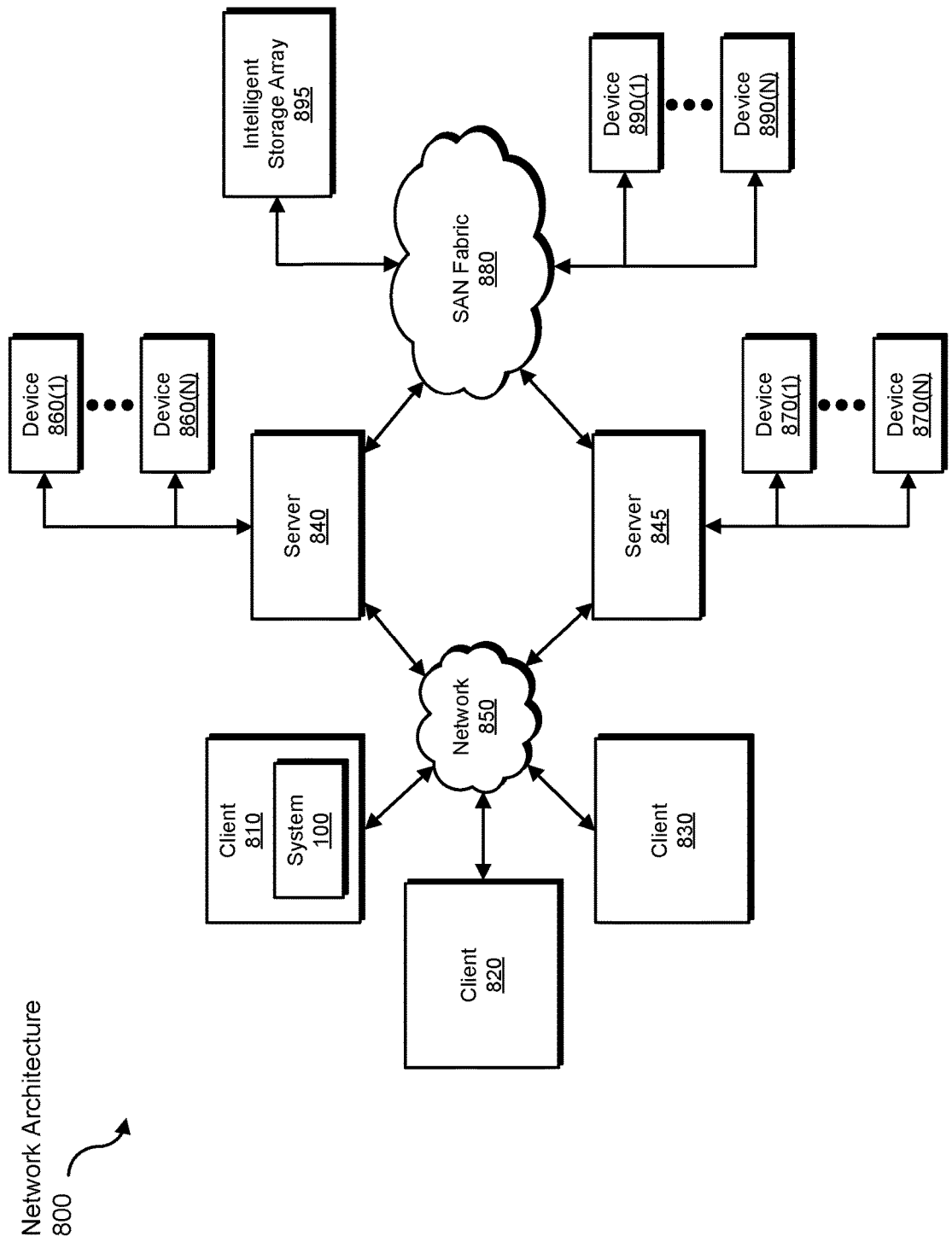
FIG. 8 is a block diagram of an example computing network capable of implementing one or more of the embodiments described and/or illustrated herein.

FIG. 8 is a block diagram of an example network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as example computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to example computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the example embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an example method for establishing restricted interfaces for database applications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive query data to be transformed, transform the query data, use the result of the transformation to establish a restricted interface, and store the result of the transformation to enforce the restricted interface. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for establishing restricted interfaces for database applications, at least a portion of the method being performed by a computing device comprising at least one processor, the method comprising: analyzing, by the computing device, query behavior of an application for query requests from the application to a remote database in a computer system; identifying, based on the analysis, an expected query behavior for the application, wherein the expected query behavior includes one or more query types; establishing, between the application and the remote database, a restricted interface, wherein the restricted interface includes a microservice, for each of the one or more query types of the expected query behavior, comprising a limited application configured to forward queries of the respective query type and drop queries of a query type that does not have a corresponding microservice, and establishing the restricted interface comprises modifying a code associated with the application to send query requests to one or more microservices of the restricted interface based on query type; receiving, at the restricted interface, a query request from the application to the remote database, wherein the query request is received by a microservice corresponding to a query type of the query request when the microservice corresponding to the query type of the query request is available; and limiting, by the restricted interface, the query request from the application to the remote database based on the expected query behavior, wherein the query request is dropped when the microservice corresponding to the query type of the query request is not available.

2. The computer-implemented method of claim 1, wherein limiting the query request from the application to the remote database comprises: determining, by checking the query request against the expected query behavior, that the query request is an anomalous query behavior; and performing a security action with respect to the computer system in response to determining that the query request is an anomalous query behavior.

3. The computer-implemented method of claim 2, wherein performing the security action comprises preventing the application from accessing the remote database.

4. The computer-implemented method of claim 2, wherein performing the security action comprises at least one of dropping the query request and logging the query request.

5. The computer-implemented method of claim 2, wherein the expected query behavior comprises a set of queries the application is designed to use; and wherein determining that the query request is an anomalous query behavior comprises at least one of: determining that the query request does not correspond to a query in the set of queries the application is designed to use; and determining that the query request corresponds to a query in the set of queries the application is designed to use that is being sent at an abnormal frequency.

6. The computer-implemented method of claim 1, wherein the restricted interface comprises a database proxy configured to intercept all communication between the application and the remote database.

7. The computer-implemented method of claim 1, wherein analyzing the query behavior further comprises analyzing one or more precompiled query templates associated with the application for the remote database.

8. The computer-implemented method of claim 1, wherein analyzing the query behavior further comprises analyzing a query log associated with the application for the remote database.

9. The computer-implemented method of claim 1, wherein analyzing the query behavior further comprises analyzing the code associated with the application.

10. The computer-implemented method of claim 1, wherein the code associated with the application comprises a source code of the application.

11. The computer-implemented method of claim 1, wherein the code associated with the application comprises a binary code of the application.

12. A system for establishing restricted interfaces for database applications, the system comprising: an analysis module, stored in memory, for analyzing query behavior of an application for query requests from the application to a remote database in a computer system; an identification module, stored in the memory, for identifying, based on the analysis of the analysis module, an expected query behavior for the application, wherein the expected query behavior includes one or more query types; an establishing module, stored in the memory, for establishing, between the application and the remote database, a restricted interface configured to limit query requests from the application to the remote database based on the expected query behavior, wherein the restricted interface comprises a database proxy configured to intercept all communication between the application and the remote database, and a microservice, for each of the one or more query types of the expected query behavior, comprising a limited application configured to forward queries of the respective query type and drop queries of a query type that does not have a corresponding microservice, and establishing the restricted interface comprises modifying a code associated with the application to send query requests to one or more microservices of the restricted interface based on query type; a receiving module, stored in the memory, for receiving, at the restricted interface, a query request from the application to the remote database, wherein the query request is received by a microservice corresponding to a query type of the query request when the microservice corresponding to the query type of the query request is available and the query request is dropped when the microservice corresponding to the query type of the query request is not available; a determination module, stored in the memory, for determining, by checking the query request against the expected query behavior, that the query request is an anomalous query behavior; a security action module, stored in the memory, for performing a security action with respect to the computer system in response to determining that the query request is an anomalous query behavior; and at least one physical processor that executes the analysis module, the identification module, the establishing module, the receiving module, the determination module, and the security action module.

13. The system of claim 12, wherein performing the security action comprises preventing the application from accessing the remote database.

14. The system of claim 12, wherein the expected query behavior comprises a set of queries the application is designed to use; and wherein determining that the query request is an anomalous query behavior comprises at least one of: determining that the query request does not correspond to a query in the set of queries the application is designed to use; and determining that the query request corresponds to a query in the set of queries the application is designed to use that is being sent at an abnormal frequency.

15. The system of claim 12, wherein analyzing the query behavior further comprises at least one of: analyzing one or more precompiled query templates associated with the application for the remote database or analyzing a query log associated with the application for the remote database; and analyzing a code associated with the application, wherein establishing the restricted interface further comprises modifying the code associated with the application to send query requests to the restricted interface, and wherein the code associated with the application comprises a source code or a binary code of the application.

16. A non-transitory computer-readable medium for establishing restricted interfaces for database applications comprising one or more computer-executable instructions that, when executed by at least one processor of a computing device, cause the computing device to: analyze, by the computing device, query behavior of an application for query requests from the application to a remote database in a computer system; identify, based on the analysis, an expected query behavior for the application, wherein the expected query behavior comprises a set of queries the application is designed to use and the expected query behavior includes one or more query types; establish, between the application and the remote database, a restricted interface, wherein the restricted interface comprises a database proxy configured to intercept all communication between the application and the remote database, and one or more microservices and a microservice is a limited application configured for a specific type of database query; receive, at the restricted interface, a query request from the application to the remote database, wherein the query request is received by a microservice corresponding to a query type of the query request when the microservice corresponding to the query type of the query request is available, and the query request is dropped when the microservice corresponding to the query type of the query request is not available, the query request is dropped when the query type does not have a corresponding microservice, and establishing the restricted interface one or more microservices of the restricted interface based on query type; and limit, by the restricted interface, the query request from the application to the remote database based on the expected query behavior.

17. The computer-readable medium of claim 16, wherein the instructions for limiting the query request further cause the computing device to: determine, by checking the query request against the expected query behavior, that the query request is an anomalous query behavior, and perform a security action with respect to the computer system in response to determining that the query request is an anomalous query behavior.

18. The computer-readable medium of claim 17, wherein performing the security action further comprises preventing the application from accessing the remote database.

19. The computer-implemented method of claim 6, wherein the database proxy includes the one or more microservices.

20. The computer-implemented method of claim 1, wherein the one or more microservices reside on a server hosting the remote database.

* * * * *

UNITED STATES PATENT AND TRADEMARK OFFICE
CERTIFICATE OF CORRECTION

PATENT NO. : 11,012,452 B1
APPLICATION NO. : 15/865304
DATED : May 18, 2021
INVENTOR(S) : Daniel Kats et al.

Page 1 of 1

It is certified that error appears in the above-identified patent and that said Letters Patent is hereby corrected as shown below:

In the Claims

In Column 24, Line 13, Claim 16, after "available," delete "and"

In Column 24, Line 17, Claim 16, after "interface" insert -- comprises modifying a code associated with the application to send query requests to --

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*